(12) United States Patent
Jewell et al.

(10) Patent No.: US 11,879,531 B1
(45) Date of Patent: Jan. 23, 2024

(54) WELDED TORQUE CONVERTER COMPONENT

(71) Applicant: Schaeffler Technologies AG & Co. KG, Herzogenaurach (DE)

(72) Inventors: Jeremy Jewell, Wooster, OH (US); Craig McBurney, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/861,392

(22) Filed: Jul. 11, 2022

(51) Int. Cl.
| | |
|---|---|
| *F16H 41/28* | (2006.01) |
| *F16H 45/02* | (2006.01) |
| *B23K 33/00* | (2006.01) |
| B23K 101/00 | (2006.01) |
| F16H 41/24 | (2006.01) |

(52) U.S. Cl.
CPC ............. *F16H 41/28* (2013.01); *F16H 45/02* (2013.01); *B23K 33/004* (2013.01); *B23K 2101/00* (2018.08); *B23K 2101/001* (2018.08); *F16H 2041/243* (2013.01); *F16H 2045/0221* (2013.01)

(58) Field of Classification Search
CPC .... F16H 41/28; F16H 2041/243; F16H 45/02; B23K 2101/001; B23K 33/004
See application file for complete search history.

(56) References Cited

U.S. PATENT DOCUMENTS

| | | |
|---|---|---|
| 2012/0151907 A1 | 6/2012 | Jimenez et al. |
| 2016/0131238 A1 | 5/2016 | McBurney et al. |
| 2020/0032887 A1 | 1/2020 | McBurney et al. |

*Primary Examiner* — Christopher J Besler
(74) *Attorney, Agent, or Firm* — Volpe Koenig

(57) ABSTRACT

A method of forming a welded connection between a hub and a plate component in a transmission assembly is provided. The method includes providing the plate component which includes a radially extending portion and an opening in a connection region to the hub, forming a flare bevel with an axial extension that extends beyond a projection of a thickness of the radially extending portion of the plate component at the opening, locating the plate component with the flare bevel and at least a portion of the axial extension on the hub, welding in a recess formed between the flare bevel and the hub to connect the plate component to the hub with the weld, and removing at least a portion of the axial extension after the welding.

7 Claims, 4 Drawing Sheets

WELDED TORQUE CONVERTER COMPONENT

FIELD OF INVENTION

The disclosure relates to a welded assembly, and more particularly to welded torque converter assembly, and more specifically to a welded connection between a torque converter impeller or turbine hub to an associate plate component, as well as an associated method.

BACKGROUND

U.S. Pub. 2012/0151907 discloses a method of connecting an impeller hub and impeller shell of a torque converter.

FIG. 1 shows a schematic cross-sectional side view of a torque converter 10 including an impeller 12 assembled in a manner similar to the impeller of U.S. Pub. 2012/0151907. The torque converter 10 includes a cover 14 including a front cover 16 and a rear cover 18, which is formed by an impeller shell 20 of impeller 12. The cover 14 houses a lockup clutch 22 and a damper 24, which are both schematically shown, and a turbine 26 opposite of impeller 12. The lockup clutch 22 engages with and disengages from front cover 16 and the damper 24, which is connected to a turbine hub 30, couples the turbine 26 to the lockup clutch 22 such that the turbine 26 is circumferentially driven with the front cover 16 when the lockup clutch 22 is engaged with the front cover 16. The impeller 12 further includes an impeller hub 46 welded to impeller shell 20 and the impeller blades 36 supported by a rounded portion 34 of impeller shell 20. An inner radial end of the impeller shell 20 extends past the weld and abuts an axial surface of the impeller hub 46.

U.S. Pub. 2016/0131238 is also directed to a method of connecting an impeller hub and shell of a torque converter with an improved weld connection.

It would be desirable to further improve the welded connection between a pump or impeller hub and shell by increasing the weld size and/or penetration to increase strength and reduce failures while not affecting the overall space requirements. It would also be desirable to provide an improved assembly of a damper plate to a turbine hub.

SUMMARY

In one aspect, a method of forming a welded connection between a hub and a plate component in a transmission assembly is provided. The method includes providing the plate component which includes a radially extending portion and an opening in a connection region to the hub, forming a flare bevel with an axial extension that extends beyond a projection of a thickness of the radially extending portion of the plate component at the opening, locating the plate component with the flare bevel and at least a portion of the axial extension on the hub, welding in a recess formed between the flare bevel and the hub to connect the plate component to the hub with the weld, and removing at least a portion of the axial extension after the welding.

By forming the welded connection between the hub and the plate component of a transmission in this manner, stress concentration contours that previously had go further up the hub and double back on themselves to get to the plate for the known overlapped and welded connection are avoided. Additionally, the present method avoids prior known axially offset arrangements at the weld connection where stress contours had to transition around a 3-dimensionally curved offset. The present arrangement also allows the weld gun to be directed at the greater thickness components, increasing the weld size and/or penetration while reducing stress by having the weld at least partially inline with the plate component.

In one embodiment, the weld is located at least in an area of a radial projection of the thickness of the radially extending portion of the plate component. Here, the flare bevel is offset by at least this thickness to allow the weld to be formed in this area.

In one embodiment, the method further includes removing at least a portion of the weld in a root area beyond the radial projection of the thickness of the radially extending portion of the plate component. This removing may be accomplished by machining and/or grinding.

In one arrangement, the hub is an impeller hub of a torque converter and the plate component is an impeller shell.

Here, the weld can be a contiguous weld on a back axial surface of the impeller shell.

In one arrangement, the method further comprises machining a portion of the axial extension and the hub to form a radially extending axial bearing surface.

In another arrangement, the hub is a turbine hub, and the plate component is part of or connected to a torque converter turbine.

In a further aspect, a torque converter component is provided, and includes an impeller shell configured to support a plurality of impeller blades, with the impeller shell including a radially extending portion and an opening in a connection region. An impeller hub is provided, and the impeller shell further includes a flare bevel with an axial extension that extends beyond a projection of a thickness of the radially extending portion of the impeller shell at the opening. A weld is located between the flare bevel of the impeller shell and the impeller hub, with the weld being at least partially located in a recess formed between the flare bevel and the impeller hub.

In one embodiment, the axial extension is adapted to contact an outer surface of the impeller hub during assembly.

In one embodiment, a radially extending, axial bearing surface is formed at least in part in an area of the flare bevel, the weld and the impeller hub, with the axial bearing surface being formed, preferably machined, after the weld.

In one embodiment, the weld is located at least in an area of a radial projection of the thickness of the radially extending portion of the impeller shell.

Additionally, at least a portion of the weld can removed in a root area beyond the radial projection of the thickness of the radially extending portion of the impeller shell, depending on the end configuration required for the completed part.

In another aspect, a torque converter component is provided having a damper support plate including a radially extending portion and an opening in a connection region, and a turbine hub. The damper plate further includes a flare bevel with an axial extension that extends beyond a projection of a thickness of the radially extending portion of the damper plate at the opening. A weld is located between the flare bevel of the damper plate and the turbine hub, with the weld being at least partially located in a recess formed between the flare bevel and the turbine hub.

In one embodiment, the axial extension is adapted to contact an outer surface of the damper hub during assembly.

In one embodiment, the weld is located at least in an area of a radial projection of the thickness of the radially extending portion of the damper plate.

In one embodiment, at least a portion of the weld can be removed in a root area beyond the radial projection of the thickness of the radially extending portion of the damper plate, depending on the end configuration required for the completed part.

Various features of the invention can be used alone or in combination in order to achieve one or more of the benefits described herein.

BRIEF DESCRIPTION OF THE DRAWINGS

The foregoing Summary and the following detailed description will be better understood when read in conjunction with the appended drawings, which illustrate preferred embodiments according to the disclosure. In the drawings.

DETAILED DESCRIPTION

Figure 1:
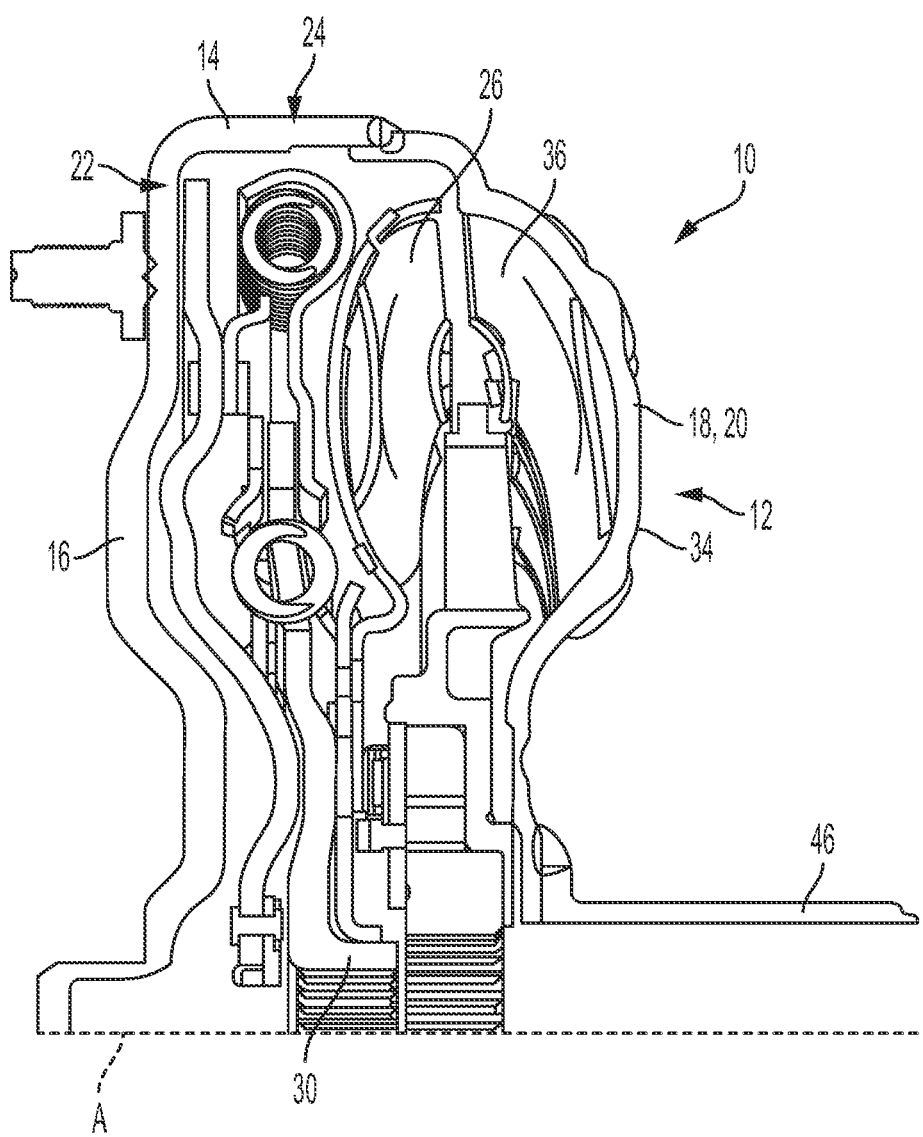
FIG. 1 is a schematic cross-sectional view of a prior art torque converter.

Certain terminology is used in the following description for convenience only and is not limiting. The words "inwardly" and "outwardly" refer to directions toward and away from the parts referenced in the drawings. "Axially" refers to a direction along the axis of a shaft. "Radially" refers to a direction approximately normal to an axis. A reference to a list of items that are cited as, for example, "at least one of a or b" (where a and b represent the items being listed) means any single one of the items a or b, or a combination of a and b thereof. This would also apply to lists of three or more items in like manner so that individual ones of the items or combinations thereof are included. The terms "about" and "approximately" encompass+or −10% of an indicated value unless otherwise noted. The terminology includes the words specifically noted above, derivatives thereof and words of similar import.

Figure 4:
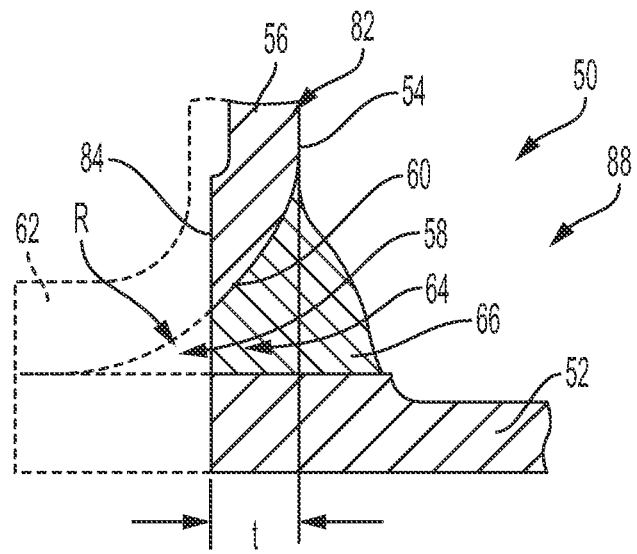
FIG. 4 is an enlarged cross-sectional view showing one embodiment of a welded connection between a hub and a plate component in accordance with the present disclosure. Here, portions of the components which are connected by the welded connection that are removed in a post machining process prior to assembly of the torque converter are shown in broken lines.
Figure 5:
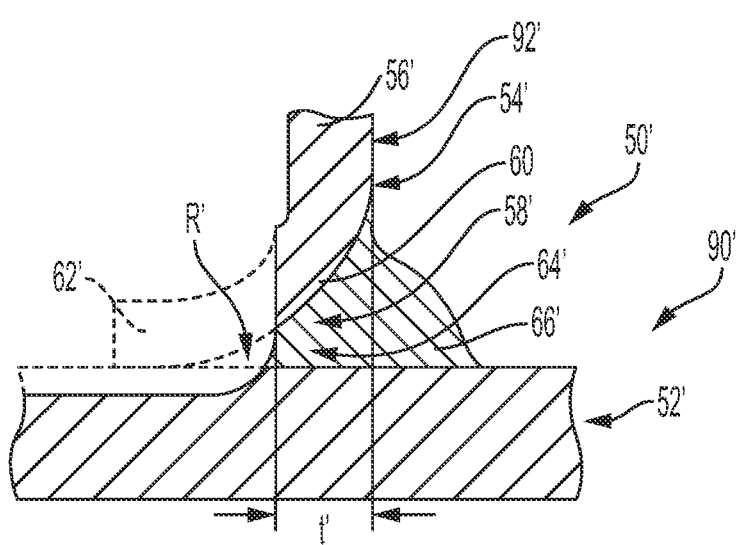
FIG. 5 is an enlarged cross-sectional view showing another embodiment of a welded connection between a hub and a plate component in accordance with the present disclosure. Here, portions of the components which are connected by the welded connection that are removed in a post machining process prior to assembly of the torque converter are shown in broken lines.

Referring to FIGS. 4 and 5, a method of forming a welded connection 50, between a hub 52, 52' and a plate component 54, 54' that are part of a transmission assembly will be described in detail. As shown in FIGS. 4 and 5, a plate component 54, 54' is provided that includes a radially extending portion 56, 56' and an opening 58, 58' in a connection region to the hub 52, 52'. A flare bevel 60, 60' is formed with an axial extension 62, 62' that extends beyond a radially defined thickness t, t' of the radially extending portion 56, 56' of the plate component 54, 54' at the opening 58, 58'. The plate component 54, 54' is located with the flare bevel 60, 60' and at least a portion of the axial extension 62, 62' on the hub 52, 52'. Welding is then carried out in a recess 64, 64' formed between the flare bevel 60, 60' and the hub 52, 52' to connect the plate component 54, 54' to the hub 52, 52' with a weld 66, 66'. At least a portion of the axial extension 62, 62' is then removed after the welding. In FIGS. 4 and 5, the broken lines represent portions of the axial extension 62, 62' of the flare bevel 60, 60' formed in the plate component 54, 54' at the opening 58, 58' that are removed in the final step. The removing can be by machining and/or grinding.

As shown in both FIGS. 4 and 5, the weld 66, 66' is located at least in an area of a radial projection of the thickness t, t' of the radially extending portion 56, 56' of the plate component, 54, 54'.

As shown in both FIGS. 4 and 5, the method may further include removing at least a portion of the weld 66, 66' in a root area R beyond a radial projection of the thickness t, t' of the radially extending portion 56, 56' of the plate component 54, 54' (indicated by the broken line section).

Figure 2:
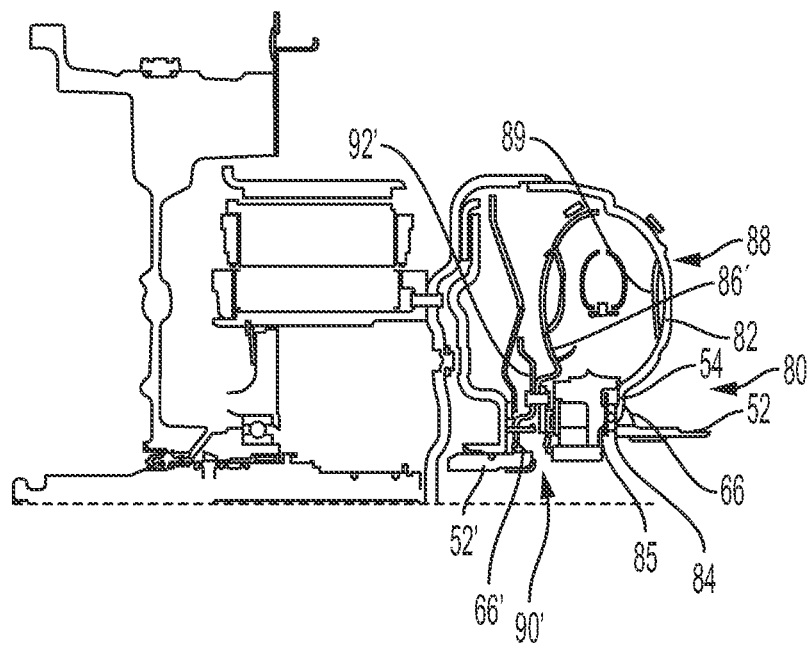
FIG. 2 is a schematic cross-sectional view of an embodiment of a torque converter including at least one torque converter component assembled with a welded connection according to the present disclosure.
Figure 3:
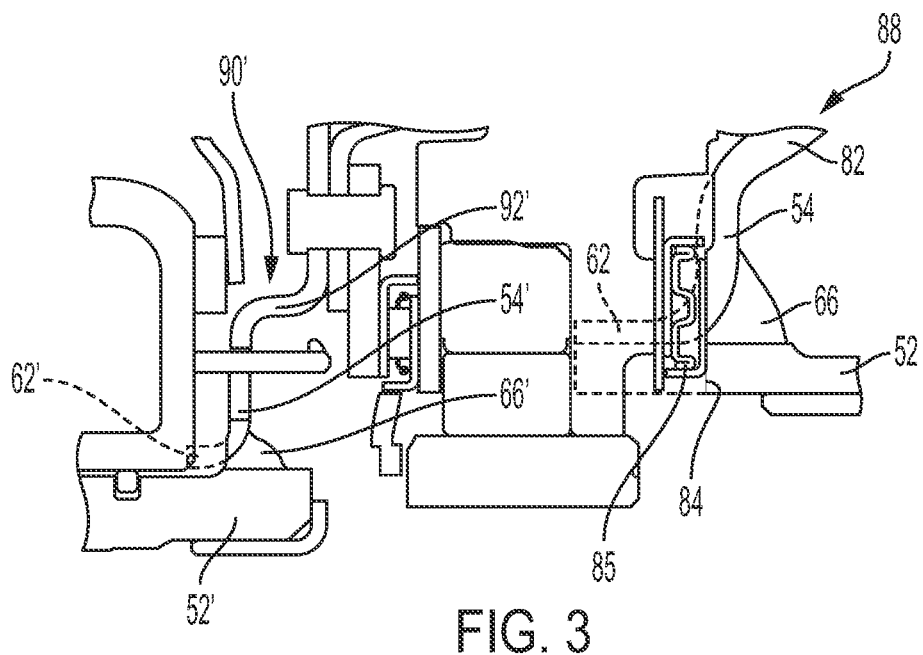
FIG. 3 is an enlarged cross-sectional view showing a portion of the torque converter assembly including two torque converter components that include a welded connection according to the present disclosure. Here, portions of the components which are connected by the welded connection that are removed in a post machining process prior to assembly of the torque converter are shown in broken lines.

In FIG. 4, the hub 52 is an impeller hub of a torque converter 80, such as shown in FIGS. 2 and 3, and the plate component 54 forms or is part of an impeller shell 82. This is also shown in FIGS. 2 and 3.

As shown in particular in FIGS. 3 and 4, the weld 66 is a contiguous weld on a back axial surface of the impeller shell 82.

Additionally, the method can further comprise here that a portion of the axial extension 62 of the flare bevel 60 as well as a portion of the hub 52 are machined to form a radially extending, axial bearing surface 84 which is used in the transmission assembly. Here, a bearing 85 shown in FIGS. 2 and 3, is used as part of the transmission assembly shown.

Referring to FIGS. 3 and 5, it is also possible to provide the hub 52' as a turbine hub for a torque converter component 90' of a transmission assembly, and in this case, the plate component 54' is a part of or connected to a torque converter turbine 86'. Here again, the axial extension 62' is removed preferably by machining and/or grinding such that a portion of the axial extension 62' as well as a portion of the turbine hub 52' are removed, as indicated with broken lines in FIG. 5.

Referring now to FIGS. 2-4 in detail, a torque converter component 88 is provided that is formed with an impeller shell 82 configured to support a plurality of impeller blades 89. The impeller shell 82 includes or is formed with the plate component 54 having the radially extending portion 56 as well as an opening 58 in a connection region. The torque converter component 88 further includes the impeller hub 52 and the impeller shell 82 including the flare bevel 60 with the axial extension 62 that extends beyond a radial projection of the thickness t of the radially extending portion of the impeller shell 82 at the opening 58 is provided. A weld 66 is formed between the flare bevel 60 of the impeller shell 82 and the impeller hub 52, with the weld 66 being at least partially located in the recess 64 formed between the flare bevel 60 and the impeller hub 52. The axial extension 62 of the impeller shell 82 is adapted to contact an outer surface of the impeller hub 52 during assembly. This can be removed in whole or in part in a further machining step in order to arrive at the finished torque converter component 88, as shown in FIGS. 2 and 3 where the removed portion(s) are indicated with broken lines. As discussed above, the torque converter component 88 can include a radially extending, axial bearing surface 84 formed at least in part in an area of flare bevel 60, the weld 66, and the impeller hub 52, with the axial bearing surface 84 being formed after the weld 66, in a post machining process.

Here, the weld 66 is located at least in an area of a radial projection of the thickness t of the radially extending portion 56 of the impeller shell 82. This provides for an improved weld with reduced stress on the torque converter component 88 in use.

As shown in detail, for example in FIG. 4, at least a portion of the weld 66 is removed in a root area R beyond a radial projection of the thickness t of the radially extending portion 56 of the impeller shell 82.

Referring to FIGS. 2, 3, and 5, a further torque converter component 90' is provided. Here, the torque converter component 90' includes the damper support plate 92' and is formed with or includes the plate component 54' having the radially extending portion 56' and the opening 58' in the connection region. A turbine hub 52' is provided, and the damper support plate 92' includes the flare bevel 60' with the axial extension 62' that extends beyond the radial projection of the thickness t' of the radially extending portion 56' of the damper support plate 92' at the opening 58'. A weld 66' is formed between the flare bevel 60' of the damper support plate 92' and the turbine hub 52', with the weld 66' being at least partially located in the recess 64' formed between the flare bevel 60' and the turbine hub 52'.

Here, the axial extension 62' is adapted to contact an outer surface of the damper hub 52' during assembly.

Additionally, as discussed above, the weld 66' is located at least in an area of the radial projection of the thickness t' of the radially extending portion 56' of the damper support plate 92'. This provides improved strength and penetration for the weld 66' as well as reduced stress on the torque converter component 90' in use.

Further, at least a portion of the weld 66' can be removed in a root area R beyond the radial projection of the thickness t' of the radially extending portion 56' of the damper support plate 92', as shown in detail in FIG. 5.

Figure 6:
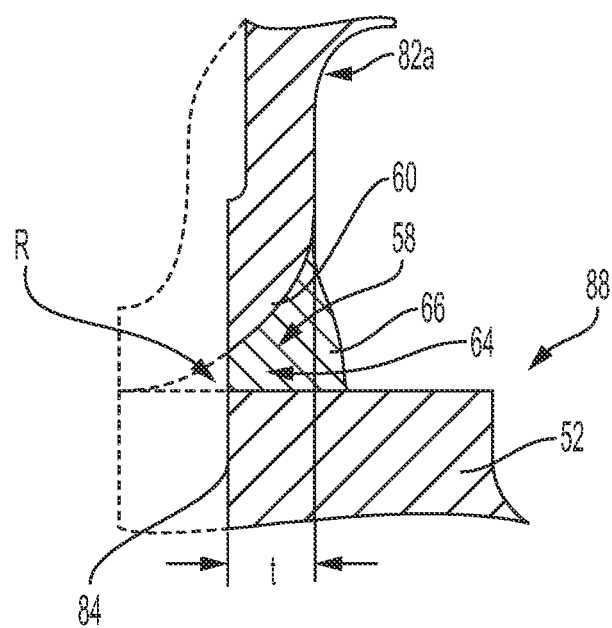
FIG. 6 is a cross-sectional view showing a further embodiment of a welded connection between a hub and a plate component in accordance with the present disclosure. Here, portions of the components which are connected by the welded connection that are removed in a post machining process prior to assembly of the torque converter are shown in broken lines.

Referring to FIG. 6, an alternate embodiment of the torque converter component 88 is shown. Here, similar parts have been labeled with the same reference numerals and the impeller shell 82a shown here has a slightly different configuration than the impeller shell 82 shown in FIG. 4.

Having thus described the presently preferred embodiments in detail, it is to be appreciated and will be apparent to those skilled in the art that many physical changes, only a few of which are exemplified in the detailed description, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope that is indicated by the appended claims rather than by the foregoing description, and all alternate embodiments and changes to this embodiment which come within the meaning and range of equivalency of said claims are therefore to be embraced therein.

LIST OF REFERENCE SYMBOLS 10 torque converter
12 impeller
14 cover
16 front cover
18 rear cover
20 impeller shell
22 lockup clutch
24 damper
26 turbine
30 turbine hub
34 rounded portion
36 impeller blades
46 impeller hub
50, 50' welded connection
52, 52' hub
54, 54' plate component
56, 56' radially extending portion
58, 58' opening
60, 60' flare bevel
62, 62' axial extension
64, 64' recess
66, 66' weld
80 torque converter
82, 82a impeller shell
84 axial bearing surface
85 bearing
86' torque converter turbine
88 torque converter component
90 torque converter component
92' damper support plate
R root area
t, t' thickness

The invention claimed is:

1. A method of forming a welded connection between a hub and a plate component in a transmission assembly, the method comprising:
   providing the plate component which includes a radially extending portion and an opening in a connection region to the hub;
   forming a flare bevel with an axial extension that extends beyond radial projections of surfaces defining a thickness of the radially extending portion of the plate component at the opening, an entirety of the axial extension located axially beyond the radial projections;
   locating the plate component with the flare bevel and at least part of the axial extension on the hub with at least a portion of the axial extension in abutting engagement with a portion of the hub;
   welding in a recess formed between the flare bevel and the hub to connect the plate component to the hub with a weld; and
   removing at least a portion of the axial extension after the welding;
   wherein the weld is at least partially located between the radial projections of the surfaces defining the thickness of the radially extending portion of the plate component.

2. The method of claim 1, further comprising removing at least a portion of the weld in a root area outside of the radial projections of the surfaces defining the thickness of the radially extending portion of the plate component.

3. The method of claim 1, wherein the hub is an impeller hub of a torque converter and the plate component is an impeller shell.

4. The method of claim 3, wherein the weld is a contiguous weld on a back-axial surface of the impeller shell.

5. The method of claim 1, wherein removing at least a portion of the axial extension after the welding further includes machining a portion of the axial extension and the hub to form a radially extending axial bearing surface.

6. The method of claim 1, wherein the hub is a turbine hub, and the plate component is part of or connected to a torque converter turbine.

7. The method of claim 1, wherein the removing step is carried out by machining.

\* \* \* \* \*